United States Patent
Tomkins et al.

(10) Patent No.: US 10,225,228 B1
(45) Date of Patent: *Mar. 5, 2019

(54) DETERMINING AN EFFECT ON DISSEMINATION OF INFORMATION RELATED TO AN EVENT BASED ON A DYNAMIC CONFIDENCE LEVEL ASSOCIATED WITH THE EVENT

(71) Applicant: Google Inc., Mountain View, CA (US)

(72) Inventors: Andrew Tomkins, Menlo Park, CA (US); Shanmugasundaram Ravikumar, Berkeley, CA (US); Shalini Agarwal, San Francisco, CA (US); MyLinh Yang, Saratoga, CA (US); Bo Pang, Sunnyvale, CA (US); Mark Yinan Li, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 341 days.

This patent is subject to a terminal disclaimer.

(21) Appl. No.: 15/052,184

(22) Filed: Feb. 24, 2016

Related U.S. Application Data

(63) Continuation of application No. 14/145,102, filed on Dec. 31, 2013, now Pat. No. 9,304,974.

(51) Int. Cl.
  *G06F 17/20* (2006.01)
  *H04L 12/58* (2006.01)

(52) U.S. Cl.
  CPC .............. *H04L 51/30* (2013.01); *H04L 51/16* (2013.01); *H04L 51/24* (2013.01)

(58) Field of Classification Search
  None
  See application file for complete search history.

(56) References Cited

U.S. PATENT DOCUMENTS

| | | | |
|---|---|---|---|
| 5,603,054 | A | 2/1997 | Theimer et al. |
| 6,115,709 | A | 9/2000 | Gilmour et al. |
| 6,438,543 | B1 | 8/2002 | Kazi et al. |
| 6,842,877 | B2 | 1/2005 | Robarts et al. |
| 7,461,044 | B2 | 12/2008 | Salahshour et al. |

(Continued)

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

(Continued)

*Primary Examiner* — Satwant K Singh
(74) *Attorney, Agent, or Firm* — Middleton Reutlinger

(57) ABSTRACT

Methods and apparatus related to determining an effect on dissemination of information related to an event based on a dynamic confidence level associated with the event. For example, an event and an event confidence level of the event may be determined based on a message of a user. An effect on dissemination of information related to the event may be determined based on the confidence level. A new confidence level may be determined based on additional data associated with the event and the effect on dissemination of information may be adjusted based on the new confidence level. In some implementations, the additional data may be based on a new message that is related to the message, such as a reply to the message.

19 Claims, 7 Drawing Sheets

(56) References Cited

U.S. PATENT DOCUMENTS

| | | |
|---|---|---|
| 7,496,500 B2 | 2/2009 | Reed et al. |
| 7,702,631 B1 | 4/2010 | Basu et al. |
| 7,730,007 B2 | 6/2010 | Salahshour et al. |
| 7,813,916 B2 | 10/2010 | Bean |
| 7,895,137 B2 | 2/2011 | Salahshour et al. |
| 8,046,226 B2 | 10/2011 | Soble et al. |
| 8,055,707 B2 | 11/2011 | Desai et al. |
| 8,108,206 B2 | 1/2012 | Hufnagel et al. |
| 8,364,467 B1 | 1/2013 | Bowman et al. |
| 8,370,948 B2 | 2/2013 | Troyansky |
| 8,375,099 B2 | 2/2013 | Carroll et al. |
| 8,417,650 B2 | 4/2013 | Graepel et al. |
| 8,521,818 B2 | 8/2013 | McGann et al. |
| 8,560,487 B2 | 10/2013 | Jhoney et al. |
| 8,599,801 B2 | 12/2013 | Baio et al. |
| 9,304,974 B1* | 4/2016 | Tomkins ............ G06Q 10/1095 |
| 2009/0307212 A1 | 12/2009 | Ramot et al. |
| 2011/0010425 A1 | 1/2011 | Bernatz |
| 2012/0005221 A1 | 1/2012 | Ickman et al. |
| 2012/0030588 A1 | 2/2012 | Sinha |
| 2012/0150532 A1 | 6/2012 | Mirowski et al. |
| 2012/0239761 A1 | 9/2012 | Linner et al. |
| 2012/0290662 A1* | 11/2012 | Weber .................. G06N 99/005 709/206 |
| 2012/0317499 A1 | 12/2012 | Shen |
| 2012/0331036 A1 | 12/2012 | Duan et al. |
| 2013/0073662 A1 | 3/2013 | Meunier et al. |
| 2013/0159270 A1 | 6/2013 | Urmy et al. |
| 2013/0290436 A1 | 10/2013 | Martin et al. |
| 2013/0297551 A1 | 11/2013 | Smith et al. |
| 2015/0120555 A1 | 4/2015 | Jung et al. |
| 2018/0285340 A1* | 10/2018 | Murphy ................ G06F 17/278 |

OTHER PUBLICATIONS

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

* cited by examiner

Event: Dinner on Thursday
Place: Bob's house
Attendees: Joe, Jim, You, Bob

Would you like to create this event?

| OK | CANCEL |

FIG. 4

Reminder: Dinner
Time: 8:30
Place: Bob's house

YES    NO

FIG. 5

DETERMINING AN EFFECT ON DISSEMINATION OF INFORMATION RELATED TO AN EVENT BASED ON A DYNAMIC CONFIDENCE LEVEL ASSOCIATED WITH THE EVENT

BACKGROUND

A user may create a message related to an event and send the message to one or more other users. The user, and/or one or more of the other users, may send a reply to the message to further plan the event.

SUMMARY

This specification is generally directed to methods and apparatus related to determining an effect on dissemination of information related to an event based on a dynamic confidence level associated with the event. For example, an event and an event confidence level of the event may be determined based on a message of a user. An effect on dissemination of information related to the event may be determined based on the confidence level. A new confidence level may be determined based on additional data associated with the event and the effect on dissemination of information may be adjusted based on the new confidence level. In some implementations, the additional data may be based on a new message that is related to the message, such as a reply to the message.

In some implementations, determining the effect on dissemination of information related to the event may include determining whether information related to the event is provided and/or determining whether and/or to what extent information related to the event is influenced by the event. Adjusting the effect may include adjusting whether information related to the event is provided and/or whether and/or to what extent to which information related to the event is influenced by the event. In some implementations, the dissemination of information includes at least a first dissemination of information and a second dissemination of information, and determining and/or adjusting the effect includes determining an effect on the first dissemination of information and determining an effect on the second dissemination of information.

In some implementations, a method is provided that includes the steps of: identifying a message of a user, wherein the message includes a plurality of terms; determining an event based on the message, wherein the event includes one or more event properties that are determined based on one or more of the terms; determining an event confidence level based on the event properties; determining an effect on dissemination of information related to the event, wherein the effect is determined based on the event confidence level; identifying additional data associated with the user and the event; determining a new event confidence level based on the additional data; and adjusting the effect on dissemination of information related to the event based on the new event confidence level.

This method and other implementations of technology disclosed herein may each optionally include one or more of the following features.

The event properties may be related to one or more of attendees of the event, event location, event type, and event time.

The step of identifying the additional data may include identifying a new message of the user that is associated with the message and that is received subsequent to the message.

The additional data may be based on one or more actions of the user. The additional data may be based on a submitted search query of a user search query action of the one or more actions.

The dissemination of information may include a first dissemination of information and a second dissemination of information unique from the first dissemination of information, wherein the step of determining the effect may include the step of determining, based on the confidence level, to influence the first dissemination of information based on the event and to not influence the second dissemination of information based on the event and wherein the step of adjusting the effect may include the step of determining, based on the new confidence level, to influence both the first dissemination of information and the second dissemination of information based on the event.

The dissemination of information may include providing one or more search results to the user; wherein the step of determining the effect may include the step of determining, based on the confidence level, not to rank one or more of the search results based on the event; and wherein the step of adjusting the effect may include the step of determining, based on the new confidence level, to rank one or more of the search results based on the event.

The dissemination of information may include providing one or more search results to the user; wherein the step of determining the effect may include determining, based on the confidence level, a first extent to which one or more of the search results is ranked based on the event; and wherein the step of adjusting the effect may include determining, based on the new confidence level, a second extent to which one or more of the search results is ranked based on the event.

The dissemination of information may include providing one or more query suggestions to the user and the step of adjusting the effect may include adjusting, based on the new confidence level, a degree of influence of the event in ranking the query suggestions.

The new confidence level may be determined based on the confidence level.

The dissemination of information may include providing a notification to the user and the effect may be whether to provide the notification to the user. The dissemination of information may include providing a notification to the user and the effect may include one or more characteristics of the notification to the user.

The dissemination of information may include a first dissemination of information from a first application and a second dissemination of information from a second application unique from the first application; wherein determining the effect may include determining, based on the confidence level, the effect on the first dissemination of information based on first criteria and determining the effect on the second dissemination of information based on second criteria unique from the first criteria.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein determine, for a user, a confidence level for an event associated with one or more messages of the user and adjust an effect on dissemination of information related to the event based on the confidence level. The confidence level may be determined for a user based on one or more terms in one or more messages associated with the user and/or based on other data that is associated with the user. The effect on dissemination of information related to the event may include whether the information is provided to the user and/or whether and/or to what extent the information is influenced by the event.

It should be appreciated that all combinations of the foregoing concepts and additional concepts discussed in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 is an illustration of an example notification related to an event.

FIG. 5 is an illustration of another example notification related to an event.

DETAILED DESCRIPTION

Figure 1:
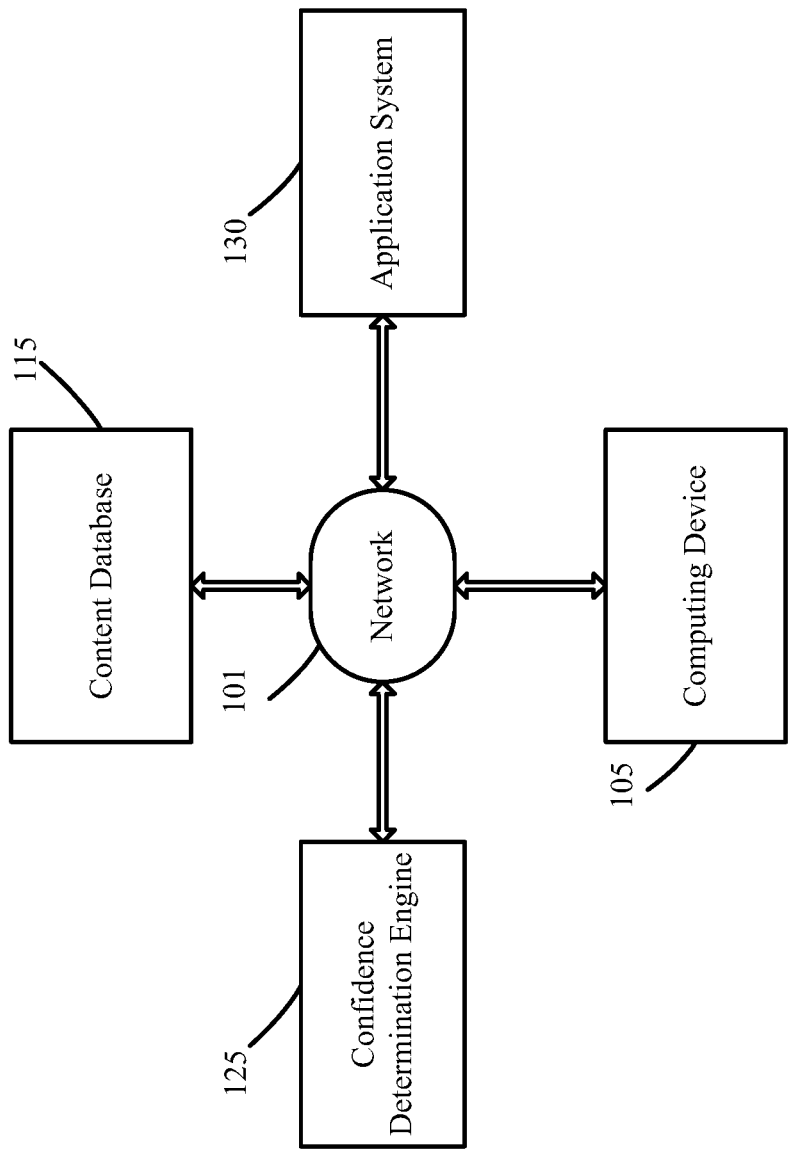
FIG. 1 is a block diagram of an example environment in which an effect on dissemination of information related to an event may be determined based on a dynamic confidence level associated with the event.

A user may send and/or receive one or more messages that are associated with an event. For example, a user may send a message to one or more other users and provide information related to an event in the message. A message that is related to an event may include information that is related to one or more event properties, such as people associated with the event, event location(s), event time(s), event date(s), and/or event type(s). As another example, a user may receive a message that is related to planning an event and the user and/or other recipients of the message may reply with related messages.

One or more messages of a user may be utilized to determine, for the user, an event and an event confidence level for the event. The event and the event confidence level may be determined based on information associated with the messages, such as terms of the messages that are associated with one or more event properties. As described herein, an effect on dissemination of information related to the event may be determined based on the event confidence level. Moreover, the effect on dissemination of information related to the event may be adjusted based on determination of a new confidence level based on additional data related to the event, such as subsequent messages related to the one or more messages on which the initial confidence level was based.

As described herein, dissemination of information related to an event may include, for example, providing a user with search results related to the event, providing a user with query suggestions related to the event, and/or providing the user with notifications related to the event. Determining and/or adjusting the effect based on a confidence level may include, for example, determining whether and/or to what extent to influence search results related to the event, determining whether and/or to what extent to influence query suggestions related to the event, and/or determining whether to provide a notification related to the event and/or determining what type of notification to provide.

As one example, a first message of a user (sent or received by the user) may include one or more terms that are indicative of an event type, such as "party," "meeting," and/or "dinner." An event that includes an event property (event type) may be determined based on the presence of such terms in the first message. An event confidence level may be determined based on the event property and/or other information associated with the first message. The event confidence level is generally indicative of a likelihood that the user has interest in the event. For example, the event confidence level may be indicative of whether the first message indicates an event (which generally indicates a likelihood that the user has interest in the event). In some implementations, a greater number of event properties and/or a greater prominence (e.g., frequency, position) of event properties in a message will result in a determined confidence level that is more indicative of confidence than a determined confidence level based on a lesser number of event properties and/or a lesser prominence of event properties in a message. An effect on dissemination of information related to the event may be determined based on the event confidence level.

Another message of the user that is related to the first message may be received subsequent to the first message. For example, a second message may be a reply to the first message and may be sent by the user and/or one or more other users. The second message may include additional information related to the determined event. For example, the second message may provide additional event properties related to the event such as a date and/or location for the event. A new event confidence level may be determined based on the additional information of the second message and, optionally, based on the information of the first message. The effect on dissemination of information related to the event may be adjusted based on the new event confidence level. For example, the new event confidence level may be more indicative of confidence than the confidence level (due to the additional event properties) and, as a result, more information may be influenced by the event and/or information may be influenced to a greater extent by the event.

Referring to FIG. 1, a block diagram of an example environment is illustrated in which an effect on dissemination of information related to an event may be determined based on a dynamic confidence level associated with the event. The environment includes computing device 105, content database 115, confidence determination engine 125, and application system 130. The environment also includes a communication network 101 that enables communication between various components of the environment. In some implementations, the communication network 101 may include the Internet, one or more intranets, and/or one or more bus subsystems. The communication network 101 may optionally utilize one or more standard communications technologies, protocols, and/or inter-process communication techniques.

Figure 7:
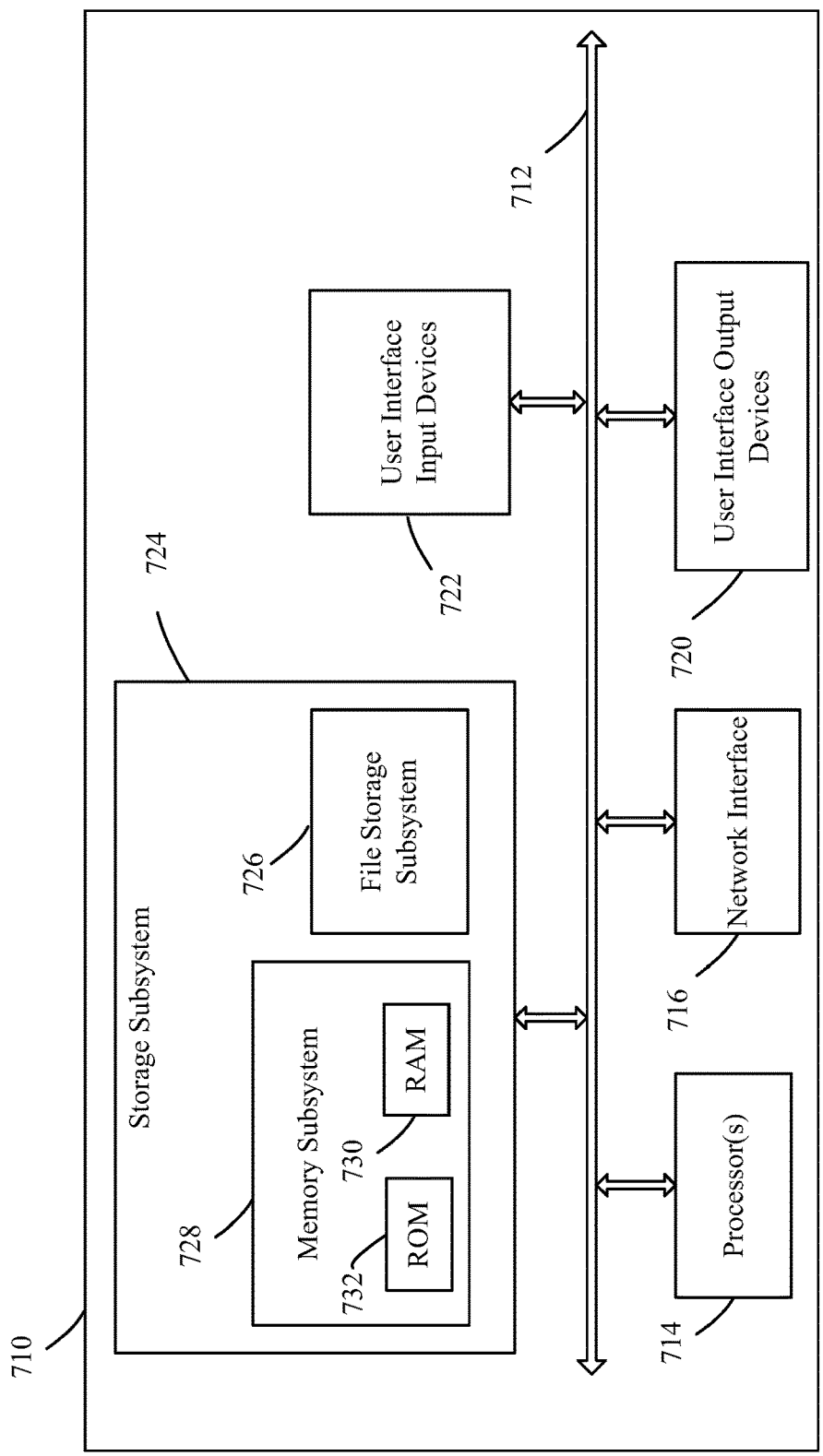
FIG. 7 illustrates a block diagram of an example computer system.

The computing device 105, content database 115, confidence determination engine 125, and/or application system 130 of the example environment of FIG. 1 may each include memory for storage of data and software applications, a processor for accessing data and executing applications, and components that facilitate communication over a network. In some implementations, computing device 105, content database 115, confidence determination engine 125, and/or application system 130 may each include hardware that shares one or more characteristics with the example computer system that is illustrated in FIG. 7. The operations performed by components of the example environment may be distributed across multiple computer systems. For example, content database 115, confidence determination engine 125, and/or application system 130 may be computer programs running on one or more computers in one or more locations that are coupled to each other through a network.

The computing device 105 executes one or more applications and may be, for example, a desktop computer, a laptop computer, a cellular phone, a smartphone, a personal digital assistant (PDA), a tablet computer, a navigation system, a wearable computer device (e.g., glasses, watch, earpiece), and/or other computing device. The computing device 105 may be utilized by a user to, for example: compose one or more messages such as those described herein; view one or more messages such as those described herein; and/or receive information related to an event such as information described herein.

In some implementations, content database 115 and/or additional databases may be utilized by one or more components to store and/or access information related to one or more messages, events, event properties, query suggestions, search results, and/or one or more notifications that may be associated with events. For example, a determined event may be stored in, and accessed from, content database 115. The event may be associated with a user and with one or more event properties, such as attendees of the event, the event location, the event type, and/or the event temporal values. A notification associated with the event may be determined based on information stored in content database 115 such as information related to the event properties of the event. A notification may include, for example, a notification that may be provided to the user via computing device 105 as a reminder for the event one hour before the event start time. Information described herein may optionally be stored in the content database 115 and/or an additional database. For example, search results and/or query suggestions described herein may be stored in a separate database and one or more event properties that may be utilized to influence the ranking of the search results and/or query suggestions may be stored in the content database 115.

The content database 115 may include one or more storage mediums. For example, in some implementations, the content database 115 may include multiple computer servers each containing one or more storage mediums. In this specification, the term "database" will be used broadly to refer to any collection of data. The data of the database does not need to be structured in any particular way, or structured at all, and it can be stored on storage devices in one or more locations. Thus, for example, the database may include multiple collections of data, each of which may be organized and accessed differently. In some implementations, the content database 115 may be a database that contains only content of a given user and that is personal to the given user. In some implementations, the content database 115 may be a database that includes content of multiple users, with access restrictions that only enable access to a given users' content by the given user and/or one or more other users and/or components (e.g., confidence determination engine 125 and/or application system 130) that are authorized by the given user.

In some implementations, content database 115 and/or another database may be utilized to identify and/or store one or more entities. For example, content database 115 may include, for each of a plurality of entities, a mapping (e.g., data defining an association) between the entity and one or more attributes and/or other related entities. In some implementations, entities are topics of discourse. In some implementations, entities are persons, places, concepts, and/or things that can be referred to by a textual representation (e.g., a term or phrase) and are distinguishable from one another (e.g., based on context). For example, the text "bush" in a query or on a webpage may potentially refer to multiple entities such as President George Herbert Walker Bush, President George Walker Bush, a shrub, and the rock band Bush.

In some implementations, an entity may be referenced by a unique entity identifier that may be used to identify the entity. The unique entity identifier may be associated with one or more attributes associated with the entity and/or with other entities. For example, in some implementations, the content database 115 may include attributes associated with unique identifiers of one or more entities. For example, a unique identifier for the entity associated with the airport with an airport code "LAX" may be associated with a name or alias attribute of "LAX," another alias attribute of "Los Angeles International Airport" (an alternative name by which LAX is often referenced), a phone number attribute, an address attribute, and/or an entity type attribute of "airport" in the entity database. Additional and/or alternative attributes may be associated with an entity in one or more databases.

In some implementations, a stored event in content database 115 may include one or more event properties that are related to the event, such as event location information, a start time, an end time, an event date, an event type, and/or one or more attendees of the event. Events may be created by a user and/or by one or more components that may identify information associated with a user and create the event based on the identified information. For example, as described herein, confidence determination engine 125 may identify a message of a user and create an event based on one or more terms in the message.

In some implementations, content database 115 may include one or more messages that are associated with the user, such as messages that were composed by the user, messages that were sent by the user, and/or messages that were received by the user from one or more other users. As used herein, a message is an electronic communication between two or more users. A message includes one or more terms and an indication of a sender and one or more recipients. Messages may include, for example, emails, text messages, social media postings, instant messages, and/or message board postings. In some implementations, a message may be a message trail of one or more related messages. For example, a message may be a message trail that includes an original message sent from User 1 to User 2 and a reply to the message sent from User 2 to User 1. In some implementations, a message may include multiple recipients. For example, User 1 may create a message and provide the message to both User 2 and User 3.

Confidence determination engine 125 may identify one or more messages of a user. In some implementations, confidence determination engine 125 may identify one or more messages from content database 115. For example, content database 115 may include one or more messages that have been sent and/or received by the user. In some implementations, confidence determination engine 125 may be a component of a messaging system and may identify messages as they are sent and/or received by the user. For example, confidence determination engine 125 may be a component of an email system and confidence determination engine 125 may identify email messages as they are created, sent, and/or received by the user.

For an identified message, confidence determination engine 125 may determine if the message is associated with an event and, if so, determine an event and an event confidence level based on the message. For example, the confidence determination engine 125 may determine the identified message is associated with an event if the identified message includes one or more terms that are indicative of event properties and/or based on other factors such as the number of recipients of the messages, the number of related messages, and/or attributes of the recipients. If the identified message is associated with an event, the confidence determination engine 125 may determine an event for the user that includes one or more event properties that are determined based on the identified message. The confidence determination engine 125 may also determine an event confidence level based on the identified message and associate the event confidence level with the event. The event and the event confidence level may be stored as an entry in the content database 115. In this specification, the term "entry" will be used broadly to refer to any mapping of a plurality of associated information items. A single entry need not be present in a single storage device and may include pointers or other indications of information items that may be present on other storage devices.

In some implementations, confidence determination engine 125 may identify one or more terms in an identified message and utilize the terms to determine an event and/or an event confidence level. Terms in a message may include, for example, one or more terms in the body, subject headings, and/or one or more sender and/or recipient identifiers. For example, confidence determination engine 125 may identify "joe@exampleurl.com," the email address of the sender of an email, as a term in the email. Also, for example, confidence determination engine 125 may identify "Bob's Birthday Party" in the subject line and/or in the body of an e-mail as terms of the email. As described herein, an effect on dissemination of information related to the event may be determined based on the event confidence level. Moreover, the effect on dissemination of information related to the event may be adjusted based on determination of a new confidence level based on additional data related to the event, such as subsequent messages related to the one or more messages on which the initial confidence level was based.

Confidence determination engine 125 may utilize one or more techniques to determine an event and/or confidence level based on identified terms. In some implementations, confidence determination engine 125 may identify terms of the message that are associated with entities that are related to one or more event properties and utilize those terms and/or entities to determine event properties of an event and/or determine an event confidence level. For example, confidence determination engine 125 may identify one or more terms that are aliases of entities that are associated with a "people" entity in content database 115, and confidence determination engine 125 may determine that the terms that are associated with a "people" entity are related to an "event attendees" event property. Also, for example, confidence determination engine 125 may identify one or more terms that are associated with a "places" entity in content database 115, such as identifying a relationship between an entity with an alias of "Restaurant 1" and a "places" entity, and determine that the identified terms may be related to an "event location" event property. Also, for example, confidence determination engine 125 may identify one or more terms that are associated with an "event type" entity in content database 115, such as identifying a relationship between an entity with an alias of "dinner" and an "event type" entity, and determine that the identified terms may be related to an "event type" event property.

In some implementations, confidence determination engine 125 may identify one or more terms that are in a format that is indicative of information that may be related to an event. For example, confidence determination engine 125 may identify "11/11/13" in a message and determine that, based on the term having a format that is indicative of a date (XX/XX/XX), the term may be related to an "event date" event property. Also, for example, confidence determination engine 125 may identify the term "joe@exampleurl.com" and determine that, based on the term having a format that is indicative of an email address, the term may be related to an "event attendee" event property.

In some implementations, confidence determination engine 125 may utilize part of speech taggers, named entity taggers, text parsers, classifiers, and/or other natural language processing components to determine information of a message that may be related to an event. For example, confidence determination engine 125 may utilize output of a named entity tagger to identify text of a message that is related to a place. The confidence determination engine 125 may determine an event location based on the tagged place, optionally utilizing an entity database and/or other database to determine if the tagged place is a potential event location (e.g., based on one or more properties of the tagged place in the entity database). Also, for example, the confidence determination engine 125 may utilize a parse tree output of a text parser that includes part of speech tags for text of a text segment, and a mapping defining the associations between the text of the text segment. For example, for a message that includes a segment "Let's plan a dinner next Saturday", parse tree output may be utilized to identify the term "plan" is a verb, the term "dinner" is the object of the verb, and the term "Saturday" is a proper noun related to a date and that qualifies the phrase "plan dinner". In some implementations the confidence determination engine 125 may utilize an entity database to determine that the term "plan" is an alias mapped to an entity associated with an event action, to determine that the term "dinner" is an alias mapped to an entity associated with an event type, and/or to determine that the term "Saturday" is an alias mapped to an entity associated with an event date. Based on the parse tree output and/or the entity database mapping, the confidence determination engine 125 may determine the segment relates to an event and may identify an entity associated with the term "dinner" as an event type event property and an entity associated with the term "Saturday" as an event date event property.

As another example, confidence determination engine 125 may identify "Restaurant 1" in a message and additionally identify "next Thursday" in the message. Confidence determination engine 125 may determine an event that includes the event properties "Restaurant 1" as an "event location" event property for the event and "next Thursday" and/or a determined date for "next Thursday" as an "event date" event property based on the terms they were identified in the message.

Confidence determination engine 125 may determine an event confidence level based on the identified event properties in the message or message trail. Generally, the confidence level is indicative of a likelihood that the determined event is of interest to the user. In some implementations, a greater number of event properties and/or a greater prominence (e.g., frequency, position) of event properties in a message will result in a determined confidence level that is more indicative of confidence than a determined confidence level based on a lesser number of event properties and/or a lesser prominence of event properties in a message. For example, confidence determination engine 125 may determine an event confidence level based on a quantity of event properties in the message. For example, the more event properties that are present in the message, the more indicative of confidence the confidence level may be. Also, for example, confidence determination engine 125 may further determine an event confidence level based on a prominence of event properties in the message. For example, the more prominently featured event properties are in the message, the more indicative of confidence the confidence level may be. For example, presence of a set of one or more event properties in the subject of a message or the first paragraph of a message, standing alone, may be more indicative of confidence than presence of the set in the last paragraph of a multi-paragraph message standing alone.

In some implementations, confidence levels may be determined for each of one or more event properties of the determined event and an overall confidence level determined based on the confidence levels. For example, confidence determination engine 125 may determine a confidence level associated with an "event location" event property, an "event date" event property, and "event date" event property, an "event type" event property, and/or an "event attendee" event property. The confidence level for an individual event property may be based on, for example, the prominence (e.g., frequency, position) of the event property in the message and/or the clarity of the event property in the message. For example, the more prominently featured an event property is in the message, the more indicative of confidence the confidence level may be. For example, an event property occurring in the subject of a message or the first paragraph of a message, standing alone, may be more indicative of confidence than presence of the event property in the last paragraph of a multi-paragraph message standing alone. Also, for example, the more clear an event property is in the message, the more indicative of confidence the confidence level may be. Clarity may be based on, for example, how many potential conflicting members of the event property are indicated by the message and/or the prominence of one or more of the potentially conflicting members. For example, a message pertaining to planning a dinner may mention "Restaurant 1" and mention "Restaurant 2" (e.g., "Would you all like to go to Restaurant 1 or Restaurant 2?"). Since two potentially conflicting members of an "event location" event property are present, the confidence level for the event property may be less indicative of confidence than if only one of the members were present. However, if "Restaurant 2" is mentioned more prominently then "Restaurant 1" (e.g., if the message is part of a message trail and several people have weighed in on the preference for "Restaurant 2"), then the confidence level for the "event location" event property may be more indicative of confidence.

Confidence determination engine 125 may determine an overall event confidence level based on the event property confidence levels. One or more techniques may be utilized to determine the overall event confidence level based on multiple individual confidence levels. For example, a weighted and/or unweighted average of one or more of the individual confidence levels may be utilized. Also, for example, a sum of the confidence levels may additionally and/or alternatively be utilized. Additional and/or alternative techniques may be utilized to determine a confidence level for an event based on a message.

Figure 3:
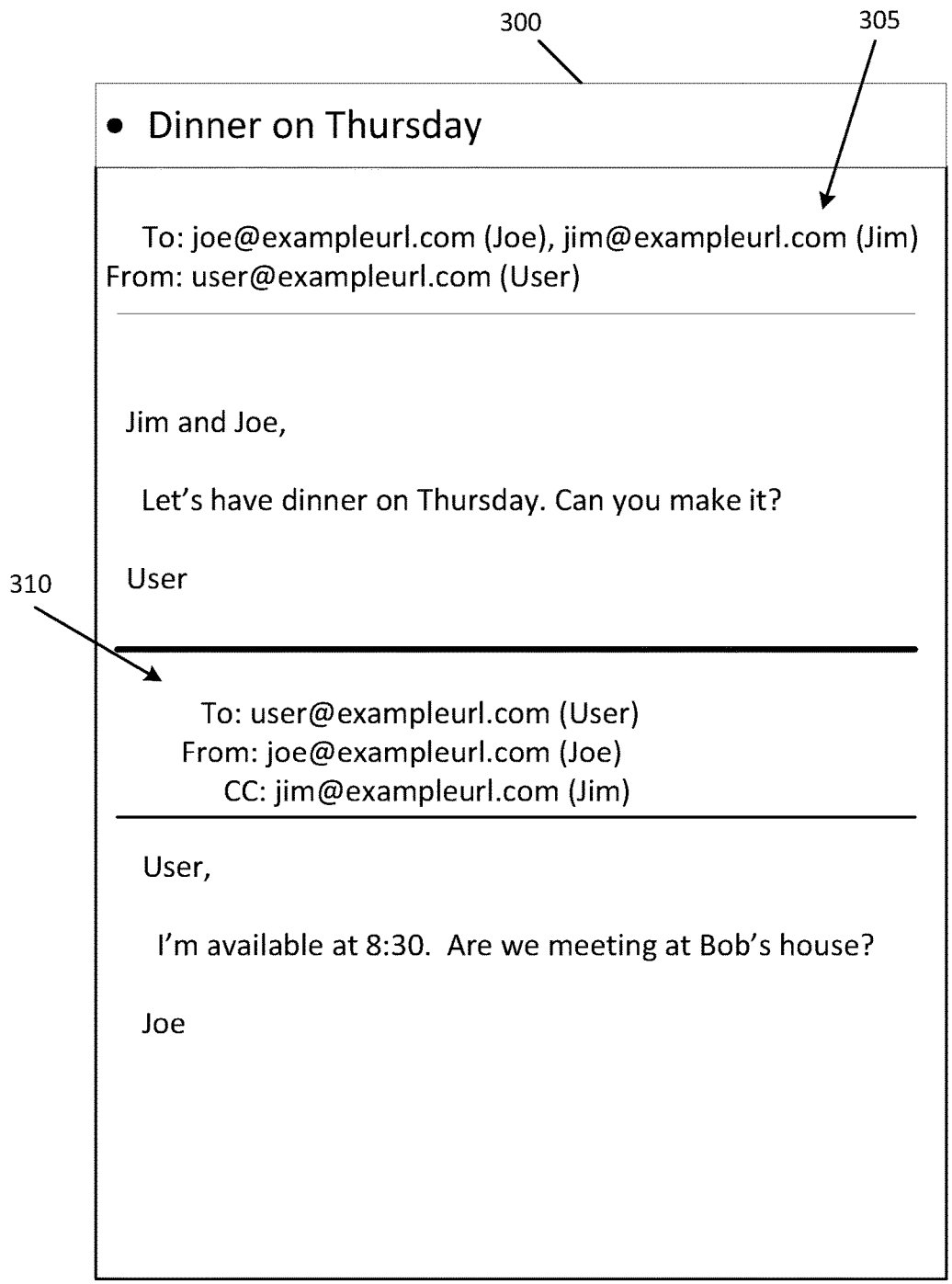
FIG. 3 is an illustration of an example message.

Referring to FIG. 3, an example message is provided. The message is a message trail 300 that includes an initial message 305 and a reply message 310. In some implementations, confidence determination engine 125 may identify initial message 305 and determine an event and a confidence level for the event based on one or more terms in the initial message 305. In some implementations, confidence determination engine 125 may determine an event and a confidence level for the event based on identifying one or more terms in message trail 300. In some implementations, confidence determination engine 125 may identify the initial message 305, determine an event and a confidence level for the event based on the terms in initial message 300, subsequently identify reply message 310 as additional data, and determine a new confidence level for the event based on one or more terms in the reply message 310.

In some implementations, confidence determination engine 125 may identify one or more terms in initial message 305 that are indicative of an event. For example, confidence determination engine 125 may identify the term "dinner" as a term that is associated with an event type. For example, confidence determination engine 125 may identify an entity in content database 115 with an alias of "dinner" and that is associated with a "party" entity and/or an "event" entity. Also, for example, confidence determination engine 125 may identify "Thursday" as a time that may be associated with an "event date" event property of an event. Also, for example, confidence determination engine 125 may identify "Joe," "Jim," and/or "User" (based on the terms in the body and/or the e-mail addresses in the To:/From: lines) as people that may be associated with an "event attendees" event property of an event.

In some implementations, confidence determination engine 125 may determine a confidence level for the event based on the terms that were identified in initial message 305. Confidence determination engine 125 may utilize one or more techniques to determine the confidence level, such as techniques described herein. For example, confidence determination engine 125 may determine that initial message 305 includes one or more terms that are associated with an "event attendees" event property, with an "event type" event property, and with an "event date" event property and determine a confidence level based on the message including those terms but not terms that are associated with an "event location" event property and an "event time" event property. As described herein, an effect on dissemination of information related to the event may be determined based on the determined event confidence level.

In some implementations, confidence determination engine 125 may identify additional data that may be related to the determined event. In some implementations, the additional data may be an additional message that is related to the message or message trail that was utilized to determine the event. In some implementations, the additional data may additionally and/or alternatively include data based on one or more actions of a user. For example, additional data may include data related to a search query submitted by the user that includes one or more terms that are associated with event properties of the determined event. Also, for example, the additional data may include a document navigated to and/or a search result selected by the user that may be associated with one or more event properties of the determined event. Also, for example, additional data may include data related to a locational query of the user that seeks directions to a location that is associated with an "event location" event property of the event.

In some implementations, the identified additional data may be a message that is related to the message or message trail that was utilized to determine the event and the confidence level. For example, the additional data may be a new message that is directly associated (e.g., a "reply") with the message or message trail that was utilized to determine the event. Also, for example, the additional data may be a message that is not directly associated with the message or message trail that was utilized to determine the event, but that includes information that includes information that indicates it is associated with the message or message trail and/or associated with the determined event. For example, an email message may be utilized to determine the event and the confidence level that is associated with the event, and a text message that includes the same users as the email may be identified as additional information. Also, for example, an email message may be utilized to determine the event and the confidence level that is associated with the event, and a separate email message that is not a reply to the message may be identified as additional information if it includes for example, the same or similar recipients, the same or similar subject line, one or more terms of the body of the message in common, and/or the same or similar event properties. For example, confidence determination engine 125 may identify an additional message as additional data, wherein the message includes a similar subject line as the first message and/or has one or more terms in common with the first message.

In some implementations, the confidence determination engine 125 may utilize the additional data to determine a new confidence level for the event. For example, a new message that is identified by confidence determination engine 125 as additional data may include one or more terms that may be utilized to identify additional data associated with one or more event properties. The additional data may be related to one or more new event properties of the event and/or to the existing event properties of the event. A new confidence level may be determined for the event based on the additional data.

For example, referring to FIG. 3, an example of utilizing an additional message that is associated with the event as additional data is described. Confidence determination engine 125 may initially identify initial message 305 and determine an event and an associated confidence level based on the terms of the initial message 305. Confidence determination engine 125 may identify reply message 310 as additional data related to the initial message 305. For example, confidence determination engine 125 may be a component of a messaging system and identify reply message 310 as a reply to initial message 305. Also, for example, confidence determination engine 125 may additionally and/or alternatively determine that the reply message is additional data associated with the initial message based on, for example, the initial message 305 and the reply message 310 including the same users as senders and/or recipients, similar terms, and/or similar subject headings.

Confidence determination engine 125 may identify one or more terms in reply message 310 that maybe associated with an event. For example, confidence determination engine 125 may identify the term "8:30" and determine that the term is a time based on the format of the term. Confidence determination engine 125 may determine that "8:30" may be associated with an "event time" event property. Also, for example, reply message 310 includes indications of the people that were identified in initial message 300 and additionally includes a reference to "Bob," which may be associated with an "attendee" event property. Also, for example, reply message 310 includes the term "Bob's house" and confidence determination engine 125 may identify an entity associated with "Bob's house" that is additionally associated with a "location" property and/or "location" entity. Confidence determination engine 125 may determine that "Bob's house" may be a term that is associated with an "event location" event property.

Confidence determination engine 125 may determine a new confidence level for the event associated with initial message 305 based on the additional data that was identified in reply message 310. Confidence determination engine 125 may adjust the previously determined confidence level based on the additional data to determine the new confidence level and/or determine the new confidence level based on the terms of message 305 and 310. For example, confidence determination engine 125 may determine a new confidence level based on message 310 that is more indicative of confidence than the confidence level based on message 305 alone. For example, the new confidence level may be more indicative of confidence since the message 310 includes "event time" and "event location" event properties that were not included in the initial message 305.

The immediately preceding example is an example of determining a new confidence level that is more indicative of confidence based on additional event properties being present in a new message. In some implementations, a new confidence level that is more indicative of confidence may additionally and/or alternatively be determined based on increased clarity of one or more event properties. For example, a first message may mention "event location" event properties of "Restaurant 1 and Restaurant 2", and a subsequent message may mention only "Restaurant 2". Based on the increased prominence of "Restaurant 2", the "event location" event property may be clarified, and a new confidence level that is more indicative of confidence determined. Also, in some implementations, a new confidence level that is less indicative of confidence may be determined based on decreased clarity of one or more event properties. For example, a first message may mention an "event location" event property of "Restaurant 1" only, and a subsequent message may mention a conflicting member of the event property such as "Restaurant 2" (e.g., "I don't like Restaurant 1, how about Restaurant 2?"). Based on the addition of the conflicting member "Restaurant 2", the "event location" event property may be less clear, and a new confidence level that is less indicative of confidence determined.

Confidence determination engine 125 may identify further additional messages that are associated with message trail 300 and may determine additional event properties and/or event confidence levels when additional data is identified in subsequent related messages. For example, further new confidence levels for an event may be determined as additional messages are identified by confidence determination engine 125. As described herein, additional messages may include information that may result in further new confidence levels that are either more indicative of confidence in the event, or less indicative of confidence in the event.

In some implementations, confidence determination engine 125 may identify data that was submitted by the user and utilize the submitted data to determine a new confidence level for the determined event. For example, a user may submit a search query of "Where is Restaurant 1" and confidence determination engine 125 may identify the query as additional information. Confidence determination engine 125 may have determined an event that includes "Restaurant 1" as an event location and determine a new confidence level based on identifying the user submitting a query that includes "Restaurant 1." Confidence determination engine 125 may determine a confidence level that is more indicative of the event having interest to the user based on identifying the query associated with the term "Restaurant 1." Also, for example, a user may submit a search query that includes the term "Where are good places for birthday parties" and identify an event that is associated with an "event type" event property of "birthday party," and determine a new confidence level for the event that is more indicative of user interest in the event based on identifying a search query submitted by the user that includes "birthday party".

Application system 130 includes one or more applications that may disseminate information to a user and/or one or more applications that interface with applications that may disseminate information to a user. For example, application system 130 may include a calendar application and/or a component of a calendar application that may disseminate information associated with events, such as notifications of upcoming events and/or recommendations for events to add to a user's calendar. Also, for example, application system 130 may include a recommendation application that disseminates information associated with recommendations to events, locations, etc. Also, for example, application system 130 may include a search engine that receives a search query, identifies documents responsive to the search query, and generates search results based on the identified documents. Also, for example, application system 130 may include a query suggestion system that receives a query (such as a partial query) and identifies one or more query suggestions based on the query (such as an autocomplete suggestion in the case of a partial query).

Also, for example, the application system 130 may include one or more applications that interface with applications that may disseminate information to a user. For example, the application system 130 may determine and/or alter data stored in one or more databases utilized by applications that may disseminate information to a user. Such data may be utilized by the respective application(s) to effect dissemination of information related to the event. For example, the application system 130 may provide data that is indicative of one or more of the event properties of an event and that indicates whether, and/or to what extent, one or more applications should utilize the event properties to influence information disseminated by the application.

For example, the application system 130 may determine, based on a confidence level for an event, that event properties for the event should be utilized by a search engine to influence ranking of search result documents, but should not be utilized at all by a calendar application. Based on such a determination, the application system 130 may provide information related to the event properties to a database utilized by the search engine, but not provide the information (or provide it with a "don't use" flag) to a database utilized by the calendar application. As another example, the application system 130 may determine, based on a confidence level for an event, that event properties for the event should be utilized by a search engine to influence ranking of search result documents, and utilized by a recommendation engine to influence ranking of recommendations provided to a user. Based on such a determination, the application system 130 may provide information related to the event properties to a database utilized by the search engine, and provide information related to the event properties to a database utilized by the recommendation engine. In implementations in which the search engine and recommendation engine may utilize the same database, the information may be provided to the database, with flags and/or other indication that indicate the search engine and the recommendation engine should both utilize the information to influence respective of search results and recommendations.

In some implementations, confidence determination engine 125 may, directly or indirectly (e.g., via content database 115), provide application system 130 with event properties of a determined event, and/or one or more confidence levels associated with the event. For example, confidence determination engine 125 may determine an event from a message, determine a confidence level for the event based on the terms of the message, and provide the determined confidence level with one or more event properties to application system 130. Confidence determination engine 125 may further provide application system 130 with a new confidence level for the event and additional event properties (if any) when additional data is identified and the new confidence level is determined based on the additional data.

Application system 130 may determine an effect on dissemination, to a user, of information related to an event of the user. As described herein, the effect on dissemination of information may be based on a dynamic confidence level for the event, and the effect may change responsive to changes in the confidence level. For example, the application system 130 may determine whether and/or to what extent to disseminate information related to an event to a user based on the confidence level associated with the event. For example, in implementations where the application system 130 includes an application that provides a notification related to the event (e.g., a reminder and/or a recommendation related to the event), the application may only provide a notification when the confidence level associated with the event satisfies a threshold value. Also, for example, in implementations where the application system 130 includes an application that ranks one or more items of content based on the event (e.g., promoting search results, recommendations, and/or query suggestions that relate to the event), the application may only rank the content based on the event when the confidence level associated with the event satisfies a threshold value. Also, for example, in implementations where the application system 130 includes an application that provides a notification related to the event (e.g., a reminder and/or a suggestion related to the event), the format of the notification, the content of the notification, and/or the time at which the notification is provided may be determined based on the confidence level associated with the event. Also, for example, in implementations where the application system 130 includes an application that ranks one or more items of content based on the event, the extent of ranking based on the event (e.g., the weighting of a ranking signal based on the event) may be determined based on the confidence level associated with the event.

In some implementations, the extent to which event properties of an event are utilized to determine and/or rank disseminated information related to an event, may be based on individual confidence levels that may optionally be determined for the event properties as described herein. For example, a first event property of an event that has a confidence level indicative of high confidence in the event property may more strongly influence determination and/or ranking of information than a second event property of an event that has a confidence level indicative of low confidence in the event property.

In some implementations, determining an effect on dissemination of information related to the event includes determining an effect for a first dissemination of information related to the event and determining an effect for a second dissemination of information related to the event, wherein the first and second dissemination of information are unique. For example, in some implementations, determining an effect on dissemination of information related to the event includes individually determining an effect for each of a plurality of unique applications that may disseminate information. The criteria for determining when, and/or to what extent, to effect dissemination of information for a given application may be unique from the criteria of one or more other applications. For example, for a first application, information may be provided that is determined and/or influenced based on the event when the confidence level satisfies a first threshold. However, for a second application, information may be provided that is determined and/or influenced based on the event only when the confidence level satisfies a second threshold that is unique from the first threshold. For example, a recommendation application may provide a recommendation that is determined and/or influenced based on the event only when the confidence level is greater than 25%, whereas a calendar application may provide a notification that is determined and/or influenced based on the event only when the confidence level is greater than 50%.

In some implementations, the disseminated information may include a notification to the user and determining the effect may include determining whether to provide the notification based on the confidence level associated with the event. A notification may include, for example, a prompt to the user that an event has been created in a calendar of the user based on one or more messages. Also, for example, a notification may be a reminder to the user of an upcoming event. Also, for example, a notification may be a recommendation to the user that is associated with an upcoming event such as a recommendation related to an event location associated with the event (the same event location or a related event location). In some implementations, the notification may be provided to the user when the confidence level associated with the event satisfies a threshold. For example, application system 130 may be provided with an event with a confidence level of 30% and application system 130 may not send a notification to the user based on the confidence level not satisfying a threshold. Confidence determination engine 125 may determine a new confidence level of 55% for the event based on additional data and application system 130 may provide a notification if 55% satisfies a threshold value to provide notifications.

In some implementations, the disseminated information may include a notification to the user and determining the effect may include determining the format of the notification, the content of the notification, and/or the time at which the notification is provided. For example, application system 130 may be provided with an event with a confidence level of 30% and application system 130 may only provide a non-obtrusive notification to the user based on the confidence level. For example, the non-obtrusive notification may include highlighting or other emphasis of information related to the event (e.g., highlighting a message associated with the event and/or highlighting event properties in the message). The emphasis may notify the user of a potential event and optionally enable the user to create a calendar entry and/or other entry by interfacing with the emphasized aspects. If the application system 130 is provided with an event with a confidence level of greater than 70% (e.g., based on a new confidence level), the application system 130 may provide a more obtrusive notification to the user based on the confidence level. For example, the more obtrusive notification may include a pop-up or other notification that includes information related to the event. The pop-up or other notification may notify the user of a potential event and optionally enable the user to create a calendar entry and/or other entry related to the event.

Referring to FIG. 4, an example notification is provided. The notification may be provided to the user, for example, if the confidence level associated with the determined event satisfies a threshold. The notification includes event properties of the event, such as an event name, an event location, and a list of attendees. The event properties may be determined by confidence determination engine 125 based on terms in one or more messages and/or additional data as described herein. The event may be populated in a calendar or other event database of the user if the user selects "OK." The user may select "CANCEL" if the user does not have interest in the event being populated in the calendar at that time. In some implementations, the user may be prompted again if the confidence level associated with the event increases based on additional data that is identified by confidence determination engine 125. In some implementations, the event may be deleted and further effects on dissemination of information related to the event suppressed if the user selects "CANCEL."

Referring to FIG. 5, another example notification is provided. In some implementations, the notification may be provided by application system 130 in response to identifying an upcoming event of the user. For example, the notification may be provided to the user one hour before the start of an event. In some implementations, application system 130 may utilize the confidence level of the determined event to affect whether to provide the notification to the user. For example, the notification may be provided to the user if the confidence level of the determined event satisfies a threshold. Also, for example, the reminder notification may be provided to the user only at a certain time, such as one hour before the event, if the associated confidence level satisfies a threshold at that time. In some implementations, the notification of FIG. 4 may be provided if the confidence level satisfies a first threshold and the notification of FIG. 5 may additionally and/or alternatively be provided if the confidence level satisfies a second threshold unique from the first threshold. For example, the notification of FIG. 4 may be provided based on an initial confidence level determined for the event, but the notification of FIG. 5 may not be provided based on the initial confidence level. A new confidence level may then be determined for the event (based on additional data as described herein), and the notification of FIG. 5 may be provided based on the new confidence level.

In some implementations, application system 130 may include a search engine and determining the effect may include determining, based on a confidence level for an event, whether and/or to what extent to rank search result documents based on the event. For example, the search engine may promote certain search result document based on the event, such as search result documents that are associated with one or more properties of the event. For example, a search result document may be associated, in an index and/or other database, with information identifying one or more terms and/or entities related to the search result document and the ranking of the search result document for a given query may be increased if one or more of those terms and/or entities is related to an event property.

In some implementations, if the confidence level for an event is above a threshold, the search engine may rank search results based on the event. Additionally or alternatively, in some implementations, the search engine may rank search results based on the event, wherein the influence of the event on the ranking is based on the confidence level. For example, an event with a confidence level of 80% may influence the ranking more than an event with a confidence level of 40%. In some implementations, any optional confidence levels determined for individual event properties may be utilized to determine what extent to rank search results based on the event properties. For example, in some implementations, the search engine may only rank search results based on a given event property if a confidence level associated with that event property satisfies a threshold. Additionally or alternatively, in some implementations, the search engine may rank search results based on a given event property, wherein the influence of the given event property on the ranking is based on the confidence level of the given event property. For example, a first event property with a confidence level of 80% may influence the ranking more than a second event property with a confidence level of 40%.

In some implementations, application system 130 may include a query suggestion engine and determining the effect may include determining, based on a confidence level for an event, whether and/or to what extent to rank query suggestions based on the event. For example, the query suggestion engine may promote certain search query suggestions based on the event, such as query suggestions that are associated with one or more event properties of the event. For example, a potential query suggestion for a given query may include or otherwise be associated with one or more terms and/or entities and the ranking of the potential query suggestion may be increased if one or more of those terms and/or entities is related to an event property. Query suggestions may include query suggestions for a submitted query such as a recommendation for an alternative query that is related to a submitted query. Query suggestions may additionally or alternatively include query suggestions for a partial query such as a recommendation for a query that is determined based on one or more characters of the partial query. For example, a query suggestion for the partial query "Re" may be "Restaurant 1".

In some implementations, if the confidence level for an event is above a threshold, the query suggestion engine may rank query suggestions based on the event. Additionally or alternatively, in some implementations, the query suggestion engine may rank query suggestions based on the event, wherein the influence of the event on the ranking is based on the confidence level. For example, an event with a confidence level of 80% may influence the ranking more than an event with a confidence level of 40%. In some implementations, any optional confidence levels determined for individual event properties may be utilized to determine what extent to rank query suggestions based on the event properties. For example, in some implementations, the query suggestion engine may only rank query suggestions based on a given event property if a confidence level associated with that event property satisfies a threshold. Additionally or alternatively, in some implementations, the query suggestion engine may rank query suggestions based on a given event property, wherein the influence of the given event property on the ranking is based on the confidence level of the given event property. For example, a first event property with a confidence level of 80% may influence the ranking more than a second event property with a confidence level of 40%.

As described, in some implementations, the query suggestion engine may provide the query suggestions to a user via computing device 105 in response to one or terms that were provided by the user via client database 105. In some implementations, ranking of the query suggestions may be utilized to determine which query suggestions are provided to a user and/or in which order the query suggestions are displayed to the user. In some implementations, ranking one or more query suggestions that are associated with a determined event may include boosting the query suggestions in a ranked list to increase the likelihood that the user will be provided the query suggestions. For example, a scoring associated with a query suggestion related to the event may be increased to a score that is higher than the score the query suggestion would otherwise have in a list of ranked query suggestions.

Figure 6A:
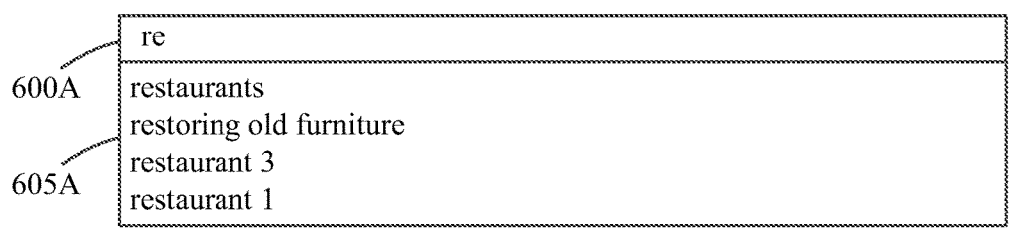
FIG. 6A is an illustration of an example of providing query suggestion results.

Referring to FIG. 6A, an example of providing query suggestions to a user is illustrated. In FIG. 6A, the ranking of the query suggestions is not being influenced based on an event based on, for example, a determination to not influence the ranking based on a low confidence level of the event. In FIG. 6A, a user has entered the partial search query "re" into a search field representation 600A and a drop down menu 605A of query suggestions is displayed. The query suggestion engine may identify one or more candidate query suggestions that may be associated with the partial query "re". For example, the query suggestion engine may use prefix based matching and/or other techniques to identify candidate query suggestions. Application engine 130 may identify query suggestions based on, for example, a list of past user queries, a list of automatically generated queries, and/or real time automatically generated queries. The drop down menu 605A includes four query suggestions that are based on the partial search query "re".

Figure 6B:
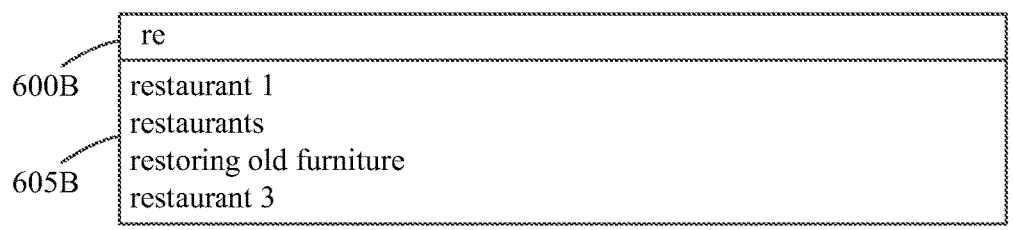
FIG. 6B is an illustration of an example of providing query suggestion results, wherein the ranking of the query suggestions is influenced by an event.

Referring to FIG. 6B, an example of providing query suggestion results to a user is illustrated, wherein the ranking of the query suggestions is influenced by an event. For example, the event may include an "event location" event property of "Restaurant 1" and a determination may be made to influence the ranking based on a high confidence level of the event. The ranking of the query suggestion "restaurant 1" is promoted in FIG. 6B based on the similarity of the query suggestion to the "event location" event property of "Restaurant 1". Similarity may be determined, for example, based on textual similarity and/or similarity of one or more entities associated with the query suggestion and the "event location" event property.

Figure 2:
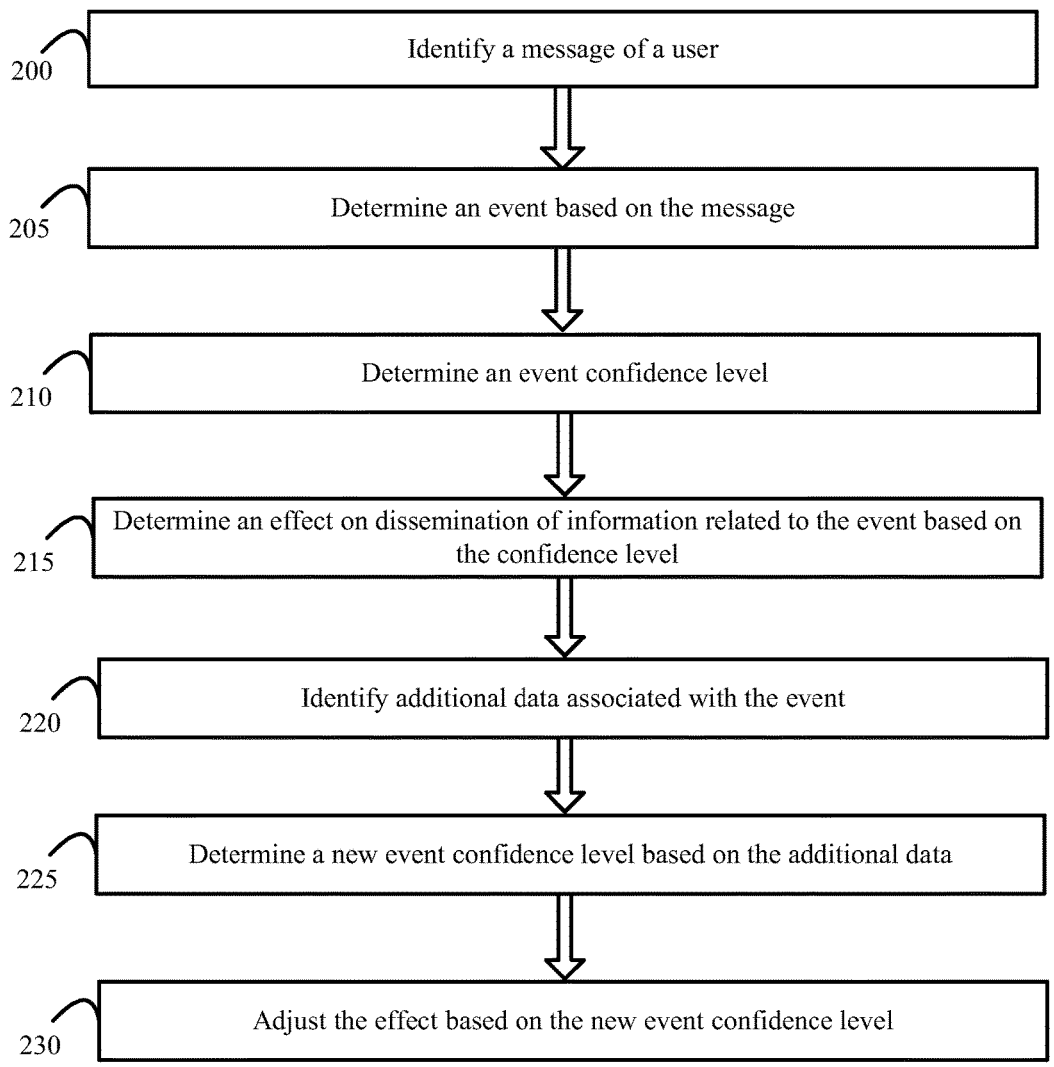
FIG. 2 is a flow chart illustrating an example method of determining an effect on dissemination of information related to an event.

Referring to FIG. 2, a flow chart illustrating an example method of determining an effect on dissemination of information related to an event is provided. Other implementations may perform the steps in a different order, omit certain steps, and/or perform different and/or additional steps than those illustrated in FIG. 2. For convenience, aspects of FIG. 2 will be described with reference to one or more components of FIG. 1 that may perform the method, such as confidence determination engine 125 and/or application system 130.

At step 200, a message that is associated with a user is identified. In some implementations, the identified message may be a message trail of one or more related messages. Messages and/or message trails may include one or more terms that may be identified in, for example, the body of the message, subject lines of the message, and/or contact information of senders and/or recipients of the message. Messages may include, for example, emails, text messages, instant messages, and/or social media postings.

At step 205, an event is determined based on the message. An event includes one or more event properties that are indicative of the event, such as an event date, an event location, an event type, and/or one or more attendees of the event. In some implementations, one or more event properties may be determined based on one or more terms that are identified in the message that was identified at step 200. For example, confidence determination engine 125 may identify "Restaurant 1" in the message, determine that "Restaurant 1" is a location based on identifying an entity with an alias of "Restaurant 1" that is associated with a "location" entity in content database 115, and determine an entity that includes "Restaurant 1" as an "event location" event property.

At step 210, an event confidence level is determined for the event. The event confidence level is indicative of likelihood that the user has interest in being associated with the event. The confidence level may be determined based on one or more event properties that have been identified in the message or message trail. For example, confidence determination engine 125 may identify an "event location" and one or more "event attendees" in a message and determine a confidence level based on the determined event properties. The event confidence level may be provided to application system 130 and/or another component by confidence determination engine 125.

At step 215, an effect on dissemination of information related to the event is determined. Dissemination of information may include, for example, providing one or more notifications to a user, providing search results to a user, and/or providing search query suggestions to a user. Determining an effect on information dissemination may include determining whether to provide a notification related to the event to a user based on the confidence level, what type of notification to provide, determining whether and/or to what extent to rank one or more search results that are related to the event, and/or whether and/or to what extent to rank one or more query suggestions that are related to an event.

As described herein, in some implementations, determining an effect on dissemination of information related to the event includes determining an effect for a first dissemination of information related to the event and determining an effect for a second dissemination of information related to the event, wherein the first and second dissemination of information are unique. For example, the first dissemination of information may relate to a first application that may provide information to the user and the second dissemination of information may relate to a second application, that is unique from the first application and that may provide information to the user. For example, the first application may be an e-mail application, such as an email application accessible via a web browser or other application executing on a computing device of the user; and the second application may be a search engine to which the user may submit queries via a computing device and receive information from the search engine in response to the queries.

At step 220, additional data associated with the event and/or the user is identified. Additional data may include one or more messages that are determined to be associated with the message and/or message trail that was utilized to determine the event. Additionally or alternatively, additional data may include data based on one or more actions of the user. For example, additional data may include one or more submitted search terms of the user, one or more search results that were selected by the user, and/or a navigational query of the user.

At step 225, a new confidence level is determined for the event based on the additional data. In some implementations, one or more terms may be identified from the additional data and the terms may be utilized to determine the new confidence level. For example, the additional data may be a new message that is associated with a previous message that was utilized to determine the event and the confidence level of step 210. The new message may include, for example, the term "8:30" that was not included in the message of step 200. Confidence determination engine 125 may determine that "8:30" is likely a time and associate "8:30" with the event as an "event time" event property. A new confidence level may be determined for the event based on the additional "event time" event property. New confidence levels may be based on additional and/or alternative factors, such as those described herein. For example, the new confidence level may be based on identifying repeated event properties in additional data, conflicting event properties in additional data, and/or identifying more specific event properties in additional data. Confidence determination engine 125 may determine the new confidence level associated with the event and provide application system 130 and/or another component with the new confidence level.

At step 230, the effect on dissemination of information related to the event is adjusted. In some implementations, application system 130 may utilize the new confidence level to determine when and/or how information related to the event is disseminated to the user. For example, application system 130 may provide a notification to the user that is related to the event based on the new confidence level satisfying a threshold value, wherein the threshold value was not satisfied by the previous confidence level associated with the event. Also, for example, application system 130 may rank one or more search results based on the new confidence level, wherein search results were not ranked or ranked to a lesser extent based on the previous confidence level associated with the event.

Also, for example, based on the previous confidence level associated with the event, it may have been determined to provide a first dissemination of information related to a first application, but not provide a second dissemination of information related to a second application that is unique from the first application. However, based on the new confidence level, it may be determined to provide both the first dissemination of information and the second dissemination of information. As described herein, additional confidence levels may be determined for an event based on further additional information and the effect on dissemination of information further adjusted. For example, steps 220, 225, and 230 may be repeated one or more times.

In situations in which the systems described herein collect personal information about users, or may make use of personal information, the users may be provided with an opportunity to control whether programs or features collect user information (e.g., information about a user's social network, email, social actions or activities, browsing history, a user's preferences, or a user's current geographic location), or to control whether and/or how to receive content from the content server that may be more relevant to the user. Also, certain data may be treated in one or more ways before it is stored or used, so that personally identifiable information may be removed. For example, a user's identity may be treated so that personally identifiable information may not be determined for the user, or a user's geographic location may be generalized where geographic location information may be obtained (such as to a city, ZIP code, or state level), so that a particular geographic location of a user may not be determined. Thus, the user may have control over how information is collected about the user and/or used.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 726 and a file storage subsystem 728, user interface input devices 722, user interface output devices 720, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to determine an event from one or more messages of a user, determine a confidence level that is indicative of user interest in the event, identify additional data associated with the message and/or event, determine a new confidence level based on the additional data, and/or adjust the effect of the confidence level on the dissemination of information related to the event. These software modules are generally executed by processor 714 alone or in combination with other processors. Memory 726 used in the storage subsystem can include a number of memories including a main random access memory (RAM) 730 for storage of instructions and data during program execution and a read only memory (ROM) 732 in which fixed instructions are stored. A file storage subsystem 728 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 728 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
identifying a message of a user, wherein the message includes a plurality of terms and is an electronic communication sent or received by the user;
determining an event based on the message, wherein the event includes one or more event properties that are determined based on one or more of the terms;
determining an event confidence level for the event based on the event properties;
determining, based on the event confidence level, an effect on dissemination of information related to the event,
 wherein the dissemination of information is related to a computer application;
identifying a new message of the user that is associated with the event and that is an additional electronic communication sent or received by the user subsequent to the message;
determining, based on the new message being associated with the event, a new event confidence level for the event based on the new message, wherein the new event confidence level is determined subsequent to the event confidence level; and adjusting, based on the new event confidence level, the effect on the dissemination of information related to the event, wherein adjusting the effect on the dissemination of information comprises:
    determining, based on the new event confidence level, an influence on the dissemination of information, the influence on the dissemination of information being reflected in output provided to the user via the computer application.

2. The computer implemented method of claim 1, wherein determining, based on the event confidence level, the effect on the dissemination of information comprises:
    determining, based on the event confidence level, to not influence the dissemination of information based on the event.

3. The computer implemented method of claim 2,
    wherein the dissemination of information includes providing a notification related to the event to the user;
    wherein determining to not influence the dissemination of information includes determining to not provide the notification related to the event to the user; and
    wherein determining to influence the dissemination of information based on the new event confidence level includes determining to provide the notification related to the event to the user.

4. The computer implemented method of claim 3, wherein the notification related to the event includes a reminder of the event.

5. The computer implemented method of claim 3, wherein the notification related to the event includes a recommendation for a location that is related to an event location of the event.

6. The computer implemented method of claim 1,
    wherein determining, based on the event confidence level, the effect on the dissemination of information comprises:
        determining, based on the event confidence level, a first extent to influence the dissemination of information based on the event; and
    wherein determining, based on the new event confidence level, the influence on the dissemination of information comprises:
        determining, based on the event confidence level, a second extent to influence the dissemination of information based on the event.

7. The computer implemented method of claim 6, wherein the dissemination of information includes providing one or more search results to the user or providing one or more query suggestions to the user.

8. The computer implemented method of claim 7, wherein the second extent is greater than the first extent.

9. The computer implemented method of claim 1, wherein the dissemination of information includes providing a notification to the user and
    wherein determining, based on the event confidence level, the effect on the dissemination of information comprises:
        determining, based on the event confidence level, first characteristics of the notification to the user; and
    wherein determining, based on the new event confidence level, the influence on the dissemination of information comprises:
        determining, based on the new event confidence level, one or more second characteristics of the notification to the user that are distinct from the first characteristics.

10. The method of claim 1, wherein determining the new event confidence level is further based on one or more actions of the user.

11. The method of claim 10, wherein determining the new event confidence level is based on a user search query action of the one or more actions.

12. A system comprising:
    memory storing instructions; and
    one or more processors operable to execute the instructions;
    wherein the instructions comprise instructions to:
        identify a message of a user, wherein the message includes a plurality of terms and is an electronic communication sent or received by the user;
        determine an event based on the message, wherein the event includes one or more event properties that are determined based on one or more of the terms;
        determine an event confidence level for the event based on the event properties;
        determine, based on the event confidence level, an effect on dissemination of information related to the event,
            wherein the dissemination of information is related to a computer application;
        identify a new message of the user that is associated with the event and that is an additional electronic communication sent or received by the user subsequent to the message;
        determine, based on the new message being associated with the event, a new event confidence level for the event based on the new message, wherein the new event confidence level is determined subsequent to the event confidence level; and
        adjust, based on the new event confidence level, the effect on the dissemination of information related to the event, wherein the instructions to adjust the effect on the dissemination of information comprise instructions to:
            determine, based on the new event confidence level, an influence on the dissemination of information, the influence on the dissemination of information being reflected in output provided to the user via the computer application.

13. The system of claim 12, wherein the instructions to determine, based on the event confidence level, the effect on the dissemination of information comprise instructions to:
    determine, based on the event confidence level, to not influence the dissemination of information based on the event.

14. The system of claim 13,
    wherein the dissemination of information includes providing a notification related to the event to the user;
    wherein the instructions to not influence the dissemination of information include instructions to not provide the notification related to the event to the user; and
    wherein the instructions to influence the dissemination of information based on the new event confidence level include instructions to provide the notification related to the event to the user.

15. The system of claim 14, wherein the second extent is greater than the first extent.

16. The system of claim 12, wherein the dissemination of information includes providing a notification to the user and
    wherein the instructions to determine, based on the event confidence level, the effect on the dissemination of information comprise instructions to:

determine, based on the event confidence level, first characteristics of the notification to the user; and wherein the instructions to determine, based on the new event confidence level, the influence on the dissemination of information comprise instructions to:

determine, based on the new event confidence level, one or more second characteristics of the notification to the user that are distinct from the first characteristics.

17. The system of claim 12, wherein the instructions to determine the new event confidence level include instructions to determine the new event confidence level based on one or more actions of the user.

18. The system of claim 17, wherein the instructions to determine the new event confidence level include instructions to determine the new event confidence level based on a user search query action of the one or more actions.

19. A non-transitory computer readable storage medium storing at least one program configured for execution by at least one processor of a computer system, the at least one program comprising instructions to:

identify a message of a user, wherein the message includes a plurality of terms and is an electronic communication sent or received by the user;

determine an event based on the message, wherein the event includes one or more event properties that are determined based on one or more of the terms;

determine an event confidence level for the event based on the event properties;

determine, based on the event confidence level, an effect on dissemination of information related to the event, wherein the dissemination of information is related to a computer application;

identify a new message of the user that is associated with the event and that is an additional electronic communication sent or received by the user subsequent to the message;

determine, based on the new message being associated with the event, a new event confidence level for the event based on the new message, wherein the new event confidence level is determined subsequent to the event confidence level; and adjust, based on the new event confidence level, the effect on the dissemination of information related to the event, wherein the instructions to adjust the effect on the dissemination of information comprise instructions to:

determine, based on the new event confidence level, an influence on the dissemination of information, the influence on the dissemination of information being reflected in output provided to the user via the computer application.

* * * * *